R. J. BENFORD.
AUTOMOBILE BED.
APPLICATION FILED FEB. 12, 1921.
1,410,731.
Patented Mar. 28, 1922.
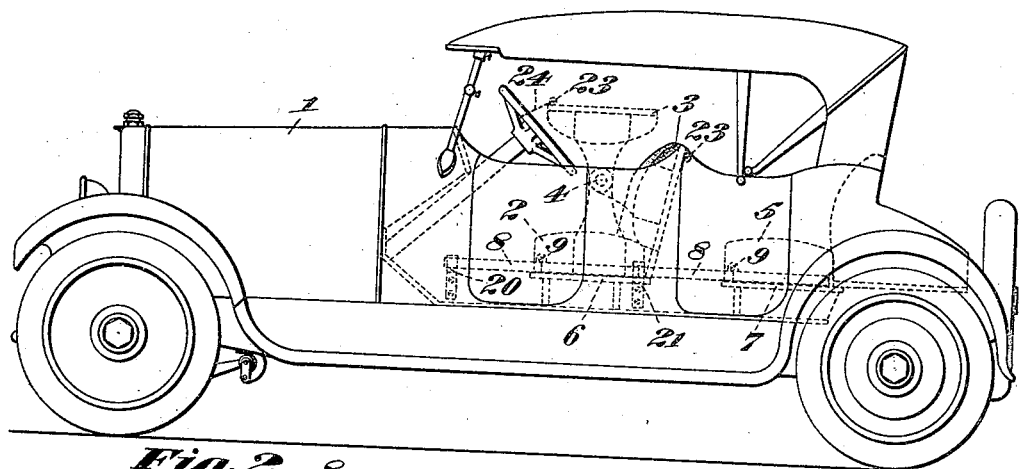
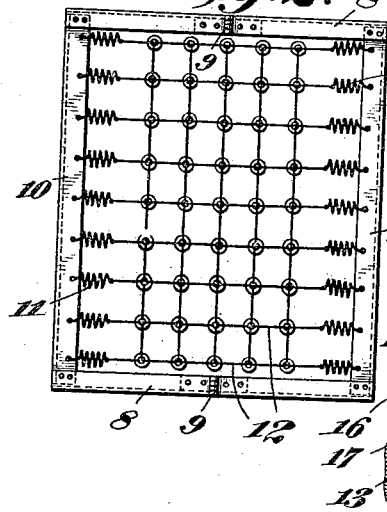
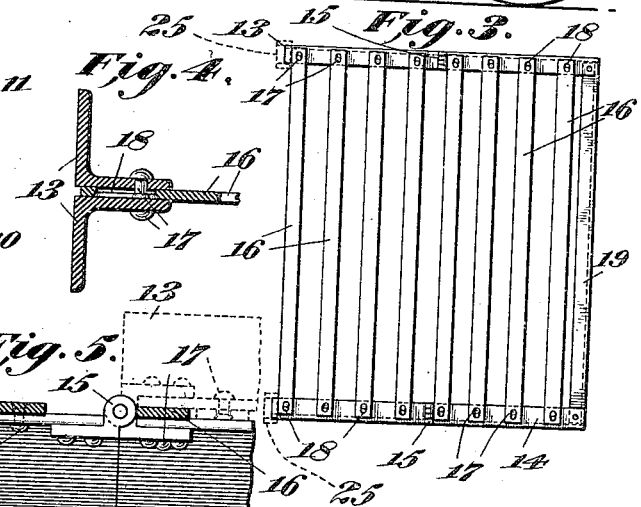
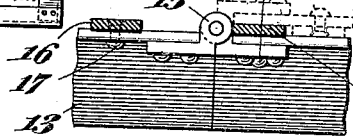
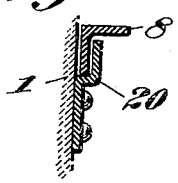
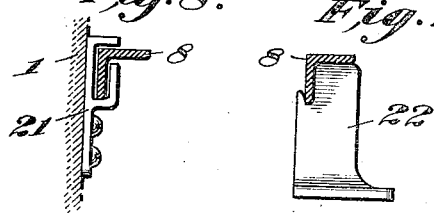
INVENTOR
Ralph J. Benford.

UNITED STATES PATENT OFFICE.

RALPH J. BENFORD, OF JOHNSTOWN, PENNSYLVANIA.

AUTOMOBILE BED.

1,410,731.  Specification of Letters Patent.  Patented Mar. 28, 1922.

Application filed February 12, 1921. Serial No. 444,350.

*To all whom it may concern:*

Be it known that I, RALPH J. BENFORD, a citizen of the United States, and residing in the city of Johnstown, in the county of Cambria and State of Pennsylvania, have invented certain new and useful Improvements in Automobile Beds; and I hereby declare the following to be a full, clear, and exact description of the invention, such as will enable others skilled in the art to which it appertains to make and use the same.

My invention relates to new and useful improvements in automobiles and its object is to provide means for converting an automobile into a bed. My invention relates more particularly to that class of automobiles which are known as touring cars, but it is evident that it can be used on other types of automobiles whose internal dimensions are sufficiently large, without departing from the spirit of my invention.

One of the objects of my invention is to provide a simple and improved frame structure for the bed, said frame structure being composed of a plurality of folding frame sections provided with springs for the bed support.

Another object of the invention is to produce a simple and effective appliance in the nature of a folding bed support which may be readily mounted upon and carried by an automobile of conventional construction and which when extended for use will provide a comfortable bed for the occupants of the car when desired.

A further object of my invention is to provide a bed support which can be easily and quickly placed in position for use in the automobile, and which can as easily be taken apart and folded up into a small compact form, so that it can be conveniently carried in the machine and will take up but little room.

Another object of my invention is to provide a bed which will be roomy and comfortable and will be thoroughly protected by the sides of the car and car top from the weather.

Still another object of my invention is to provide a bed having a folding spring frame structure which is partially supported by the seat frames of the car and so braced and supported at other points that it will be thoroughly substantial and at the same time will not mar or damage the car.

Other objects of my invention will appear hereinafter.

Having thus given a general description of my invention, I will now, in order to make the same more clear, refer to the accompanying one sheet of drawings in which like characters of reference indicate like parts:

Figure 1 is a side elevation of an automobile illustrating in dotted lines the application of my invention. Figure 2 is a top plan view of one form of spring frame section which I may use, in which short springs are attached to the ends of the frame and are connected by a wire link mesh between the said springs. Figure 3 is a top plan view of another form of a spring frame, in which transverse spring slats are used to connect the side frames together. Figure 4 is a transverse section drawn on a larger scale through the side of one of the spring frames illustrated in Figure 3, the side frame being shown in its folded position. Figure 5 is a side elevation drawn on an enlarged scale of a portion of the inside of the spring frame shown in Figure 3, illustrating the manner of hinging the members of the side frame together, the slats being shown in cross-section, with a portion of the side frame folded as shown in dotted lines.

Figure 6 is a detail view of a bracket I may use attached to the car side for supporting the ends of the spring side frame.

Figure 7 is a side elevation of a movable leg I may use in place of the brackets attached to the car side.

Figure 8 illustrates another form of a bracket I may use.

Referring now to the characters of reference on the drawings, and more especially to Figures 1 and 2 of the drawings: 1 indicates the automobile as a whole, 2 the front seat cushion, 3 the swinging back of the front seat which has its arms pivoted at 4, which allows the back of the front seat to be raised to the position shown in dotted lines in Figure 1 so as to form a temporary shelf or support for clothing or any other desired article. The rear seat cushion is indicated at 5 while the front and rear seats supporting frames are designated by the numerals 6 and 7, respectively.

In Figures 1, 2, 6, 7 and 8, the spring side frame is shown at 8 formed of angle-bars, hinged together at 9, with their ends connected together by angle-bars 10, which have perforations in their horizontal legs at spaced distances therein for holding the outer ends of springs 11, the opposite ends of the springs being connected with the strand wires of the link mesh 12, of well-known construction.

Referring now to the spring frame construction shown in Figures 3, 4 and 5, the two angle-bars side frames are shown at 13 and 14, hinged at 15, and connected together with spring slats 16, the ends of which are loosely attached to the angle side frames 13 and 14 by rivets 17 having a countersunk head for engaging the slots 18, and the ends of the spring side frames are further attached together at one end by means of an angle 19.

As indicated in dotted lines in Figure 1 the spring bed frame is preferably composed of two sections, although more or less may be used if desired, which rest upon the front and rear seat frame and disposed in such a manner that the hinge joint of each of the spring side frame sections will preferably rest upon the frame of the seats, although in some cases it may be supported by brackets if desired.

As illustrated in the drawings, I have shown the bed spring sections as hinged transversely of the car, but I wish it understood that the sections may be placed in the car with the hinges disposed longitudinally of the car and serve the purpose equally well.

The ends of the spring frame sections are supported in position by means of brackets which are attached to the car side, which may be of the form shown in Figure 6 indicated by the numeral 20, or as 21, illustrated in Figure 8 of the drawings.

In some cases instead of using brackets I may use movable legs 22 as shown in Figure 7.

As stated above the back of the front seat is raised to form a shelf when the spring frame sections are in position and the back is held in its raised position by means of a cord or strap 24, which is attached to the screw eye 23, on the rear of the front seat back and to the steering hand wheel of the car.

In the spring frame structure illustrated in Figure 3 I have shown the side frames at the one end only secured together by means of an angle-bar 19, although both ends may be connected by angle-bars 19 if desired, but in this case I prefer to use couplings 25 indicated by dotted lines in the figure, by means of which two folding sections may be secured together, thereby forming a rigid structure as a whole.

With my improved device the spring sections can be easily unfolded and put in place within the automobile, the seat cushions may be laid upon the spring, or pads, blankets or any other like covering may be laid over the spring sections to form a comfortable bed.

My invention is especially adapted for the use of campers or other parties who, either from necessity or choice, may find it desirable to sleep in the automobile. Everything is kept inside of the car, thereby avoiding damage or inconvenience from moisture or loss from oversight or theft.

My invention is also adapted for the use of salesmen and the traveling public, insuring comfortable sleeping accommodations wherever they may be when they choose to stop for the night, as well as effecting a saving in garage bills.

Location of desirable hotels need not cut down the day's mileage on a tour, as one's sleeping quarters are always located at the place he desires to stop, which permits extra touring during the best part of the day.

Overhead room is sufficient for proper and convenient care of the clothing.

Exposure to fire loss is reduced and privacy for the occupants is guaranteed.

Although I have shown and described my invention in considerable detail, I do not wish to be limited to the exact and specific details shown and described, but may use such substitutions, modifications or equivalents thereof as are embraced within the scope of my invention, or as pointed out in the claims.

Having thus described my invention, what I claim and desire to secure by Letters Patent is:

1. In an automobile bed support, comprising a plurality of frame members having parallel sides, spring slats slidably connecting the top of the parallel sides of the frame members together transversely of the bed to be formed thereon, and hinges formed centrally in the parallel sides of the frame members whereby the tops of the frame members are adapted to be folded together.

2. In an automobile bed support, comprising a plurality of frame members of angle-bars having parallel sides, couplings for connecting a pair of the frame members together, an angle-bar connecting one end of the parallel sides of each of the frame members, spring slats connecting the parallel sides of the angle-bar frame members together transversely of the bed to be formed thereon, chamfered slots formed in the ends of the spring slats, rivets attached to the parallel sides of the angle-bar frame members having projecting countersunk heads adapted to engage the chamfered slots in the ends of the spring slats, and hinged joints formed centrally on the top of the parallel sides of the frame members whereby the tops of the side frame members are adapted to be folded together with the slats on one part of each frame member seated in the spaces between the slats on the other part of said frame member.

3. In an automobile bed support, comprising a plurality of rectangular members, springs connecting two opposite sides of the rectangular members, each rectangular member hinged centrally, and means for connecting the plurality of rectangular members together.

4. In an automobile bed support, comprising a plurality of frame members, each frame member having parallel sides of angle-bars, spring slats connecting the parallel sides of the frame members transversely of the bed to be formed thereon, and hinged joints formed centrally on the top of each of the parallel sides of the frame members whereby the faces of the frame members are adapted to fold together.

5. In an automobile bed support, comprising a plurality of flanged frame members, each flanged frame member having parallel sides, spring slats connecting the parallel sides of the flanged frame members transversely of the bed to be formed thereon, slots formed in the ends of the spring slats, rivets engaging the slots in the spring slats and attached to the parallel sides of each of the flanged frames, and means for connecting the plurality of flanged frame members together.

6. In a automobile bed support, comprising a plurality of flanged frame members, each flanged frame member having parallel sides, spring slats connecting the parallel sides of the flanged frame members transversely of the bed to be formed thereon, slots formed in the ends of the spring slats, rivets within the slots in the spring slats and secured to the parallel sides of each of the flanged frames, hinged joints formed centrally on the top of the parallel sides of the frame members, and means for connecting the plurality of flanged frame members together.

7. In an automobile bed support, a frame member of angle-bars having parallel sides, spring slats connecting the parallel sides of the frame members together transversely of the bed to be formed thereon, said angle-bar frame member adapted to partially rest on the seat frames of the automobile, brackets for supporting the ends of the angle-bar frame members, and hinged joints formed centrally on the top of the angle-bar frame members.

8. In an antomobile bed support comprising a plurality of frame members of angle-bars having parallel sides, spring slats slidably connecting the parallel sides of each of the plurality of angle-bar frame members transversely of the bed to be formed thereon, slots formed in the ends of the spring slats, rivets in the slots in the spring slats and secured to the parallel sides of each of the angle-bar side frames, couplings for securing the plurality of frame members together, hinged joints formed centrally on the top of each of the frame members, said angle-bar frame members adapted to rest and be partially supported upon the seat frames of the automobile, and brackets adapted to support the remaining portions of the angle-bar frame members.

9. In an automobile bed support, comprising a plurality of frame members of angle-bars, each having parallel sides, an angle-bar connecting one end of each of the parallel sides of the frame members together the other ends of each of the parallel sides of the frame member being open, couplings for securing a plurality of angle-bar frame members together at the open ends, springs slats slidably connecting the parallel sides of the angle-bar frame members together and entirely supported thereby, chamfered slots formed in the ends of the springs slats, rivets attached to the parallel sides of the angle-bar frame members having projecting countersunk heads adapted to engage the chamfered slots in the ends of the spring slats, and hinged joints formed centrally in each of the parallel sides of the frame members and each adapted to fold upon itself with the slats on one half of the frame member seated in the spaces between the slats on the other half of the frame member.

In witness whereof I hereunto affix my signature.

RALPH J. BENFORD.